US010922792B2

(12) United States Patent
Qiu et al.

(10) Patent No.: US 10,922,792 B2
(45) Date of Patent: Feb. 16, 2021

(54) IMAGE ADJUSTMENT METHOD AND ASSOCIATED IMAGE PROCESSING CIRCUIT

(71) Applicant: Realtek Semiconductor Corp., HsinChu (TW)

(72) Inventors: Zhong-Yi Qiu, Taichung (TW); Wen-Tsung Huang, Chiayi (TW); Kai Liu, Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/732,332

(22) Filed: Jan. 1, 2020

(65) Prior Publication Data

US 2020/0394760 A1 Dec. 17, 2020

(30) Foreign Application Priority Data

Jun. 13, 2019 (TW) .............................. 108120422 A

(51) Int. Cl.
*G06T 5/00* (2006.01)
*G06T 5/20* (2006.01)

(52) U.S. Cl.
CPC ................ *G06T 5/002* (2013.01); *G06T 5/20* (2013.01); *G06T 2207/20012* (2013.01); *G06T 2207/20192* (2013.01)

(58) Field of Classification Search
None
See application file for complete search history.

(56) References Cited

U.S. PATENT DOCUMENTS

| 7,167,594 B2* | 1/2007 | Ruol .......................... G06T 5/20 |
| | | 382/254 |
| 7,729,555 B2* | 6/2010 | Chen ........................ H04N 5/21 |
| | | 382/261 |

(Continued)

FOREIGN PATENT DOCUMENTS

| CN | 105453565 A | 3/2016 |
| TW | 200833106 | 8/2008 |

OTHER PUBLICATIONS

Mahmoudi, Mona, and Guillermo Sapiro. "Fast image and video denoising via nonlocal means of similar neighborhoods." IEEE signal processing letters 12.12 (2005): 839-842. (Year: 2005).*

(Continued)

*Primary Examiner* — Andrae S Allison
(74) *Attorney, Agent, or Firm* — Winston Hsu

(57) ABSTRACT

An image adjustment method includes: sequentially processing a plurality of pixels in at least one frame, wherein a pixel under processing is a current pixel, the current pixel and multiple adjacent pixels form a current block, and each current block is performed with following operations: reading a grayscale value of each pixel in the current block; determining a region grayscale value and a region variance of the current block according to the grayscale values of the pixels; generating a variance adjustment parameter via a variance adjustment function, wherein the region grayscale value is a variable of the variance adjustment function; generating an adjusted region variance according to the variance adjustment parameter and the region variance; and comparing the adjusted region variance with a variance threshold to determine whether to perform a noise suppression operation on the current pixel.

20 Claims, 7 Drawing Sheets

(56) References Cited

U.S. PATENT DOCUMENTS

| | | | |
|---|---|---|---|
| 10,043,252 B2* | 8/2018 | Lukac | G06T 5/20 |
| 2007/0147697 A1* | 6/2007 | Lee | H04N 5/21 |
| | | | 382/260 |
| 2008/0008396 A1* | 1/2008 | Kisilev | G06T 5/002 |
| | | | 382/272 |
| 2008/0008397 A1* | 1/2008 | Kisilev | G06T 5/30 |
| | | | 382/275 |
| 2009/0154826 A1* | 6/2009 | Park | G06T 5/005 |
| | | | 382/260 |
| 2009/0285461 A1* | 11/2009 | Bohm | G06K 9/40 |
| | | | 382/128 |
| 2009/0327386 A1* | 12/2009 | Schoenblum | H04N 19/80 |
| | | | 708/400 |
| 2011/0243472 A1* | 10/2011 | Chang | G06T 5/002 |
| | | | 382/264 |
| 2013/0322745 A1* | 12/2013 | Lim | H04N 9/04515 |
| | | | 382/162 |
| 2014/0267653 A1* | 9/2014 | Richardson | H04N 5/142 |
| | | | 348/65 |
| 2015/0269735 A1* | 9/2015 | Tateno | G06K 9/4609 |
| | | | 382/153 |

OTHER PUBLICATIONS

Shreyamsha Kumar, B.K. Image denoising based on non-local means filter and its method noise thresholding. SIViP 7, 1211-1227 (2013). https://doi.org/10.1007/s11760-012-0389-y (Year: 2013).*

Zlokolica, Vladimir, Aleksandra Pizurica, and Wilfried Philips. "Noise estimation for video processing based on spatio-temporal gradients." IEEE Signal Processing Letters 13.6 (2006): 337-340. (Year: 2006).*

Zhang et al, Noise Removal in Color Images Based on Image Gradient Information, Hindawi Publishing Corporation Advances in Mechanical Engineering vol. 2014, Article ID 213609, 6 pages (Year: 2013).*

* cited by examiner

IMAGE ADJUSTMENT METHOD AND ASSOCIATED IMAGE PROCESSING CIRCUIT

BACKGROUND OF THE INVENTION

1. Field of the Invention

The invention relates to an image processing technology, more particularly to a noise suppression method for suppressing noise (or high frequency noise) in a frame.

2. Description of the Prior Art

Whether noise can be suppressed in a video system is a key factor to improve image quality. However, the real part of a frame (or, the part that actually does not belong to noise) is also weakened when performing noise suppression, resulting in an unclear image, in which a lot of details or edges features are lost. For example, the texture on user's face or texts may be eliminated as well as the noise.

In the existing image processing technology, gradients or variances of a region are calculated, so as to determine whether the region is an edge feature or the noise. The determination is usually made by partitioning the region by one or more threshold values. However, the afore-mentioned method is not an ideal approach. The image brightness actually has a decisive influence on calculation of gradients or variances. That is, the calculated gradients or variances are relative high in the region with high brightness. This makes it easy in the prior art to remove some details of the frame while removing the noise, thereby greatly degrading the user's experience.

For example, referring to FIG. 1, FIG. 1 is a schematic diagram showing an image and the optimized image by using conventional techniques. The left side of FIG. 1 is the unadjusted image. This frame mainly contains a human head and the ceiling. There is some non-ideal noise (such as noise) on the ceiling, which is the part to be eliminated. The right side of FIG. 1 is the optimized image by using conventional techniques. It can be seen that although the ceiling noise is improved, it also causes some loss in the details with edge features, such as the human's hair looks no longer well-organized, but is presented in a relatively vague way. The impact will be more serious on texts, resulting in a significant reduction in identifiability.

In summary, in the conventional techniques, loss in the details occurs while optimizing the image. This is because both the non-ideal noise and the details of the picture (such as edge features) have higher gradients or variances. Therefore, a novel way to improve the above-mentioned problems without causing side effects (or in a manner with fewer side effects) is required.

SUMMARY OF THE INVENTION

An objective of the invention is to provide an image adjustment method and associated image processing circuit that can improve the above-mentioned problems without causing side effects.

An embodiment of the invention provides an image adjustment method for adjusting an image, wherein the image comprises at least one frame and the at least one frame comprises a plurality of pixels, the method comprises: sequentially processing the pixels in the at least one frame, wherein the pixel under processing is a current pixel, the current pixel and a plurality of adjacent pixels form a current block, and each current block is processed with following operations: reading a grayscale value of each pixel in the current block; determining a region grayscale value and a region variance of the current block according to the grayscale values of the pixels; generating a variance adjustment parameter via a variance adjustment function, wherein the region grayscale value is a variable of the variance adjustment function; generating an adjusted region variance according to the variance adjustment parameter and the region variance; and comparing the adjusted region variance with a variance threshold to determine whether to perform a noise suppression operation on the current pixel.

Another embodiment of the invention provides an image processing circuit comprising a processor configured to sequentially process a plurality of pixels in at least one frame of an image, wherein the pixel under processing is a current pixel, the current pixel and a plurality of adjacent pixels form a current block, and the processor is configured to process each current block with following operations: reading a grayscale value of each pixel in the current block; determining a region grayscale value and a region variance of the current block according to the grayscale values of the pixels; generating a variance adjustment parameter via a variance adjustment function, wherein the region grayscale value is a variable of the variance adjustment function; generating an adjusted region variance according to the variance adjustment parameter and the region variance; and comparing the adjusted region variance with a variance threshold to determine whether to perform a noise suppression operation on the current pixel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion and should be interpreted as "include/comprise but not limited to", and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
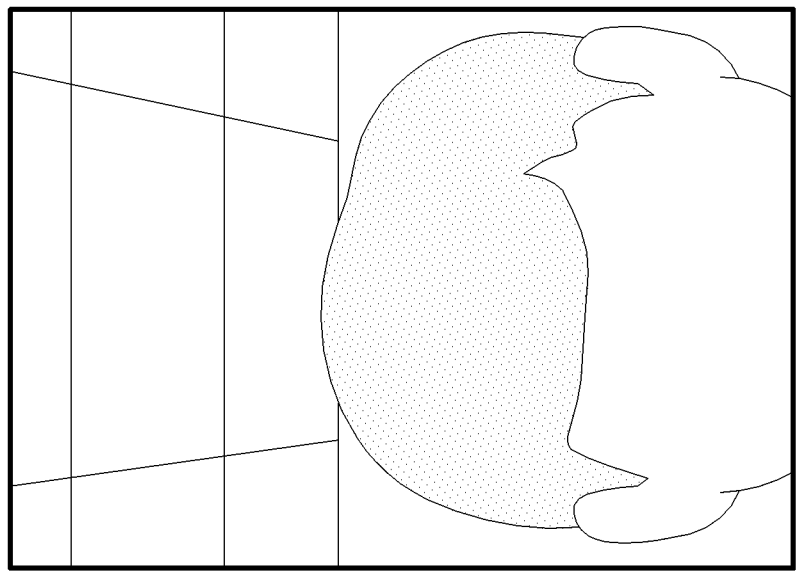
FIG. 1 is a schematic diagram showing an image and the optimized image obtained by using conventional techniques.
Figure 1:
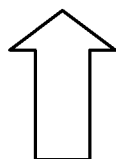
Figure 1:
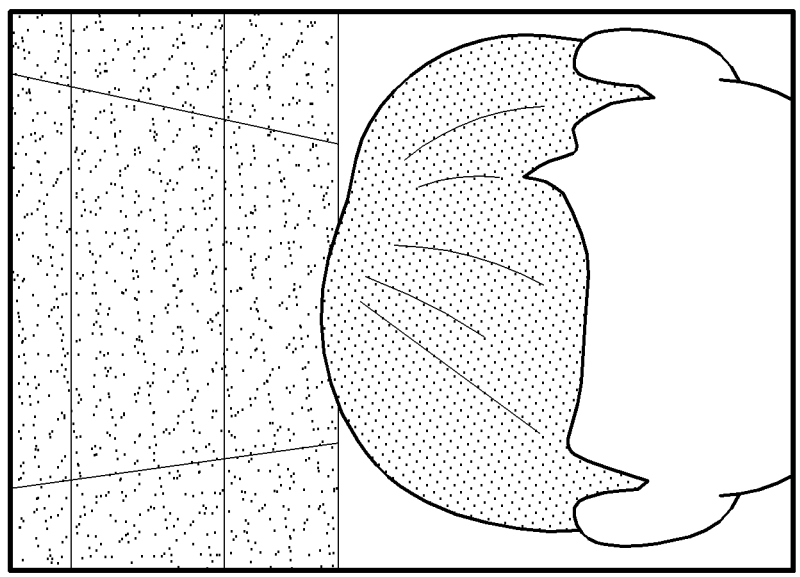

In the embodiments of the invention, at the beginning of image optimization, it is first determined whether the current image block has an edge feature, so as to determine whether the current image block belongs to noise or details of a scene. The afore-mentioned determination may be achieved by calculating the gradient or variance of the image blocks. The pixel under processing is a current pixel and the current pixel and a plurality of adjacent pixels form a current block. Next, the invention focuses on correcting gradient and variance according to brightness, so as to improve the shortcomings of conventional techniques. As can be seen from the example shown in FIG. 1, when the pixel having a higher grayscale value (for example, with a color near the white color), such as the white ceiling shown in FIG. 1, although the noise in there has extremely high gradient or variance (which shows the grayscale value difference between the noise (the black points) and the adjacent pixels of the white ceilings), the noise is actually non-ideal noise. On the contrary, the details in the human's hair have extremely high gradients or variances, which are the details to be preserved but will be treated as noise and eliminated since the grayscale values are low. In the conventional techniques, when performing the image optimization, since the brightness (or the grayscale value) is not considered together, some details will be eliminated with the noise.

In normal image processing technology, gradient or variance of a region is calculated, so as to determine whether the region is an edge or determine the amount of noise. The determination is usually made by partitioning the region by using one or more threshold values. However, the experiments show that the image brightness actually has a certain influence on the gradients or variances. That is, the calculated gradients or variances are relative high in the region with high brightness. In the following paragraphs, how to process at least one (for example, one or more) frame of an image will be described. Each frame may comprise a plurality of pixels, and the frames may be processed at the same time or individually processed.

Calculation of Region Gradient I

Figure 2:
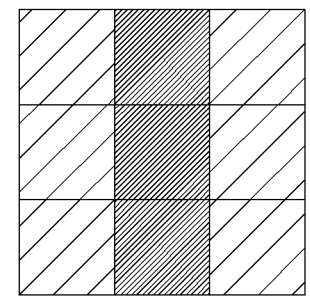
FIG. 2 is a schematic diagram showing the indices, grayscale values and presented colors of an exemplary 3×3 image block.

First of all, the region gradient is calculated so as to determine whether the region (for example, the 3×3 image block as shown in FIG. 2) belongs to edge feature or noise.

As shown in FIG. 2, the left image block comprises pixels a0-a8, the central image block shows the grayscale values corresponding to the pixels a0-a8 and the right image block shows the colors presented by the corresponding pixels a0-a8, where the grayscale 60 will present a dark color and the grayscale 225 will present a color near the white color.

When a vertical edge is detected, an average of the grayscale values of the pixels a1, a4 and a7 is subtracted from an average of the grayscale values of all the pixels a0-a8, and then the absolute value is taken therefrom to obtain a determination value (the calculation is shown below). The determination value is compared with a threshold value to obtain a high frequency response ($|(60\times3)/3-(225\times6+60\times3)/9|=110$), thereby determining whether the pixels a1, a4 and a7 collectively form the vertical edge.

Figure 3:
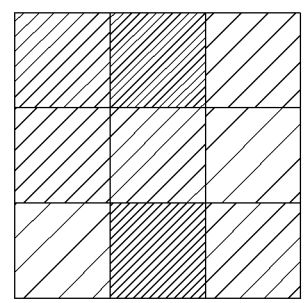
FIG. 3 is a schematic diagram showing the grayscale values and presented colors of an exemplary 3×3 image block, where the indices of the image block is the same as that in FIG. 2.
Figure 4:
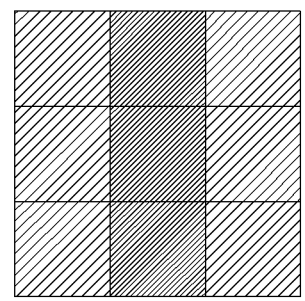
FIG. 4 is a schematic diagram showing the grayscale values and presented colors of an exemplary 3×3 image block, where the indices of the image block is the same as that in FIG. 2.

Further referring to FIG. 3 and FIG. 4, FIG. 3 and FIG. 4 respectively show the image blocks with different grayscale values. As can be seen from the grayscale values, there is no edge feature in FIG. 3. Therefore, it can be classified as a noise block. On the other hand, as can be seen from the grayscale values, FIG. 4 has a vertical edge feature. When filtering noise, such details are expected to be preserved (not filtered out). The influence of the image brightness on edge detection is illustrated as follows.

First of all, the image blocks in FIG. 2 and FIG. 3 with the same average brightness are taken as comparison. In FIG. 2, the high frequency response is 110 and the average brightness is 170. In FIG. 3, the high frequency response is 40 and the average brightness is 170. Since the vertical edge feature in the image block of FIG. 2 is expected to be shown and the noise feature in FIG. 3 is expected to be filtered out, when a threshold value is set for performing noise filtering only on the image block with the high frequency response 40 (or even lower), the details to be presented in the image block of FIG. 2 can actually be preserved. However, if only the high frequency response is considered when determining whether to perform noise filtering, in some cases, it will cause improper judgment. That is, when the same threshold value is applied for the entire frame or image, other image blocks will be inevitably affected. For example, the image block shown in FIG. 4 has strong vertical edge feature but its overall brightness is dark (its high frequency response is 40 and average brightness is 100). Such edge feature will be filtered out due to the setting of the high frequency response threshold value (40). In other words, both FIG. 2 and FIG. 4 have vertical edge features but in FIG. 4, the high frequency response is low since its average brightness is low.

Considering the problem as discussed above, a dynamic correction method is proposed. The proposed dynamic correction method is capable of setting a specific curve under different scenes (that is, different grayscale values) of the image, such that the aforementioned threshold value, the variance between pixels (for example, the gradient between pixels) can vary as the image brightness changes. In this manner, edge detection or noise suppression for the regions with different brightness can be effectively performed.

Taking the edge detections in FIG. 2-FIG. 4 as the example, in order to fully present the edge features under various brightness levels, in the embodiments of the invention, the threshold value will be dynamically set as the brightness changes. That is, for the region (or a single pixel) with a relative low brightness, a relative low threshold value is given. In this manner, the edge feature can be preserved more easily. On the contrary, for the region with relative high brightness, a relative high threshold value is given. In this manner, the noise will be filtered out more easily.

In addition, in the embodiments of the invention, different curves can be adopted to perform different segmental adjustments under different scenes, environments, user modes or sensor types, so as to optimize the noise suppression performance.

The invention focuses on adjusting the edge feature threshold value and the variance for the regions in an image with different brightness values, and it can be combined with various noise suppression technologies to improve the image quality. Details of the proposed method will be introduced in the following paragraphs.

Calculation of Region Gradient II

As mentioned above, the variance can be represented by gradient (but it is not limited thereto). For example, in the embodiments of the invention, the region gradient can be calculated by Sobel operator. The Sobel operator can be divided into gradient calculation filters in the horizontal and vertical directions, as shown on the left side and the right side in FIG. 5, in which it gives the weighting values to the current pixel (that is, the central pixel) and the adjacent pixels to be multiplied when calculating the gradient, where G is the region gradient, Gx is the horizontal gradient and Gy is the vertical gradient. The gradient can be calculated as below:

$$G=|Gx|+|Gy|$$

Figures 5, 6, 7:
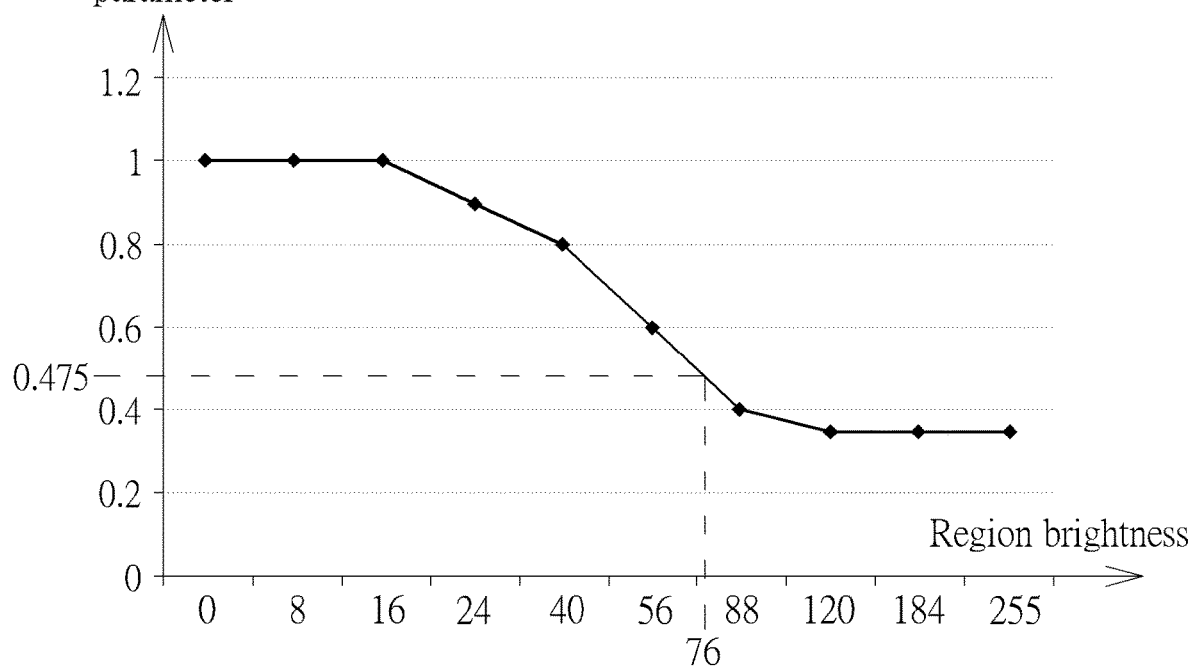
FIG. 5 is a schematic diagram showing the usage of Sobel operator in calculating the gradient weighting values.
FIG. 6 is another schematic diagram showing the grayscale values of an exemplary 3×3 image block, where the indices of the image block is the same as that in FIG. 2.
FIG. 7 is a schematic diagram showing the curve of a gradient adjustment function with respect to the region brightness.

Next, accompanying the grayscale values of the pixels as shown in FIG. 6, the calculations are illustrated below:

$$Gx=(-1)\times120+(-2)\times100+(-1)\times120+1\times60+2\times40+1\times90=-210$$

$$Gy=(-1)\times120+(-2)\times30+(-1)\times90+120+2\times80+60=70$$

Finally, the gradient $G=|Gx|+|Gy|=210+70=280$.

Calculation of Region Brightness

The calculation of region brightness (region grayscale value) $Brightness_{local}$ can be achieved by using an n×n mean filter (But the invention is not limited thereto. For example, the Gaussian filter can also be used when calculating the region brightness). Taking the 3×3 matrix shown in FIG. 6 as an example, the average brightness is 76 (obtained by $(120+100+120+80+50+30+60+40+90)\div9$).

Adjusting the Final Region Gradient According to the Region Brightness

The final region gradient $G_{final}$ may be adjusted according to the region brightness as the following function:

$$G_{final}=f1(Brightness_{local})\times G$$

Where f1 is the gradient adjustment function, which is a linear transfer function or a linear segmental adjustment function. The linear segmental adjustment function may be divided into m segments, where b1~bm correspond to different brightness segments and v1~vm are generated according to f1(b1)~f1(bm). The gradient adjustment function is expressed as the following equation and shown in FIG. 7:

$$f1 = \begin{cases} v1, & \text{when } Brightness_{local} < b1 \\ v1 + (v2 - v1) \times \dfrac{Brightness_{local} - b1}{b2 - b1}, & \text{when } Brightness_{local} < b2 \\ v2 + (v3 - v2) \times \dfrac{Brightness_{local} - b2}{b3 - b2}, & \text{when } Brightness_{local} < b3 \\ vm, & \text{when } Brightness_{local} \geq bm \end{cases}$$

FIG. 7 is a schematic diagram showing the curve of a gradient adjustment function f1 with respect to the region brightness based on the concept provided above. In FIG. 7, each diamond point represents the current gradient adjustment parameter, and the gradient adjustment parameter between two points can be obtained by linear interpolation. As shown in FIG. 7, when the region brightness is 76, the gradient adjustment parameter is 0.475, and the final (adjusted) region gradient $G_{final}$ can be derived as below:

$$G_{final}=f1(Brightness_{local})\times G=<f1(76)\times280=0.475\times280=133$$

Adjusting the Noise Suppression Strength According to the Final Region Gradient

Figure 8:
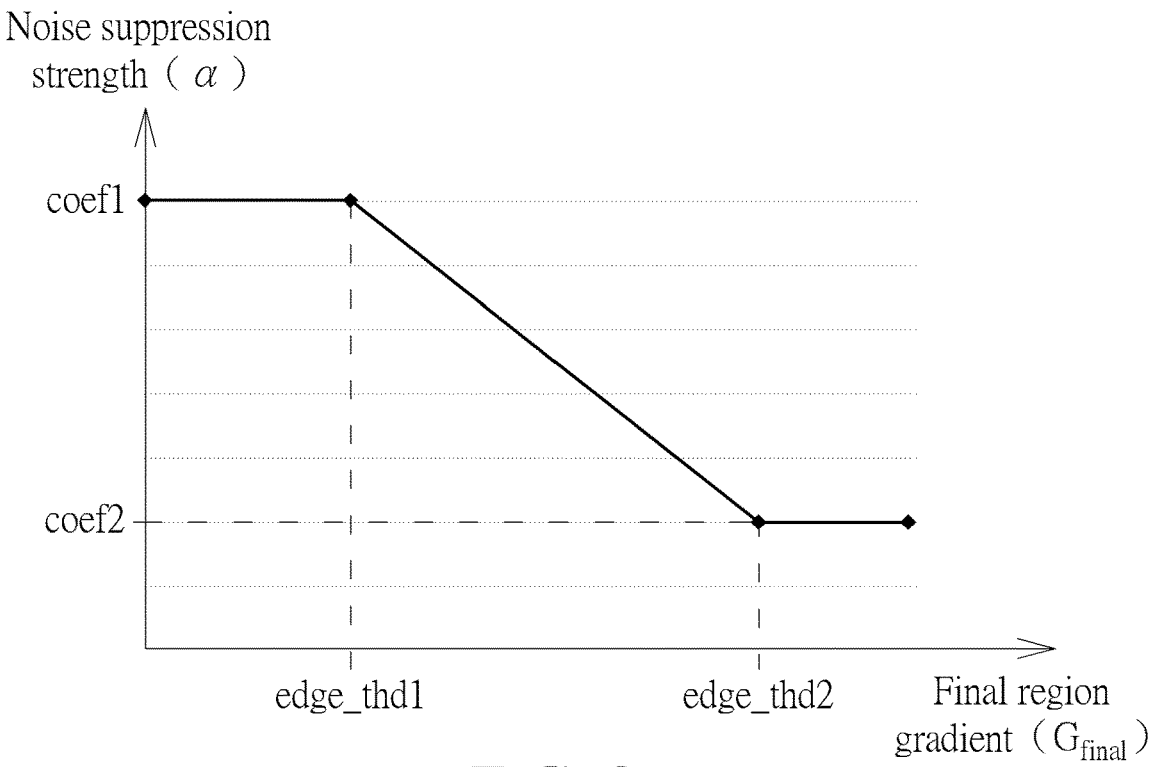
FIG. 8 is a schematic diagram showing the adjustment of the noise suppression strength.

The noise suppression can be performed with any conventional noise suppression filter. For example, in the embodiments of the invention, the mean filter can be adopted, and the final grayscale value can be obtained via the following equation as:

$$P_{out}=\alpha\times P_{lpf}+(1-\alpha)\times P_{in}$$

where $P_{in}$ is original grayscale value, $P_{lpf}$ is the grayscale value after being filtered, $P_{out}$ is the final (adjusted) grayscale value and α is a noise suppression strength (the noise suppression strength increases as α increases). The noise suppression strength α may be adjusted according to the final (adjusted) region gradient. The adjustment may be expressed as the following equation and shown in FIG. 8:

$$\alpha = \begin{cases} coef1, & \text{when } G_{final} < edge\_thd1 \\ coef1 + (coef2 - coef1) \times \dfrac{G_{final} - edge\_thd1}{edge\_thd2 - edge\_thd1}, & \text{when } edge\_thd1 < G_{final} < edge\_thd2 \\ coef2, & \text{when } G_{final} \geq edge\_thd2 \end{cases}$$

where edge_thd1 and edge_thd2 are respectively the edge feature upper threshold and the edge feature lower threshold, coef1 and coef2 are respectively user defined noise suppression strength upper and lower thresholds. Since the possibility of being an edge texture is higher when the gradient is higher, the value of noise suppression strength α should be selected as a small one (that is, using a weaker noise suppression), to avoid damaging the edge texture. For example, the value of α decreases when the final region gradient $G_{final}$ increases (note that it can be designed that α is not less than coef2, so as to prevent from losing the noise suppression effect). On the contrary, when the final region gradient $G_{final}$ is small, the value of α is large, but it can be designed that α is not greater than 1, where α=1 means that no noise suppression is performed. In the embodiments of the invention, the degree of noise suppression is dynamically adjusted by controlling the value of α.

Figure 9:
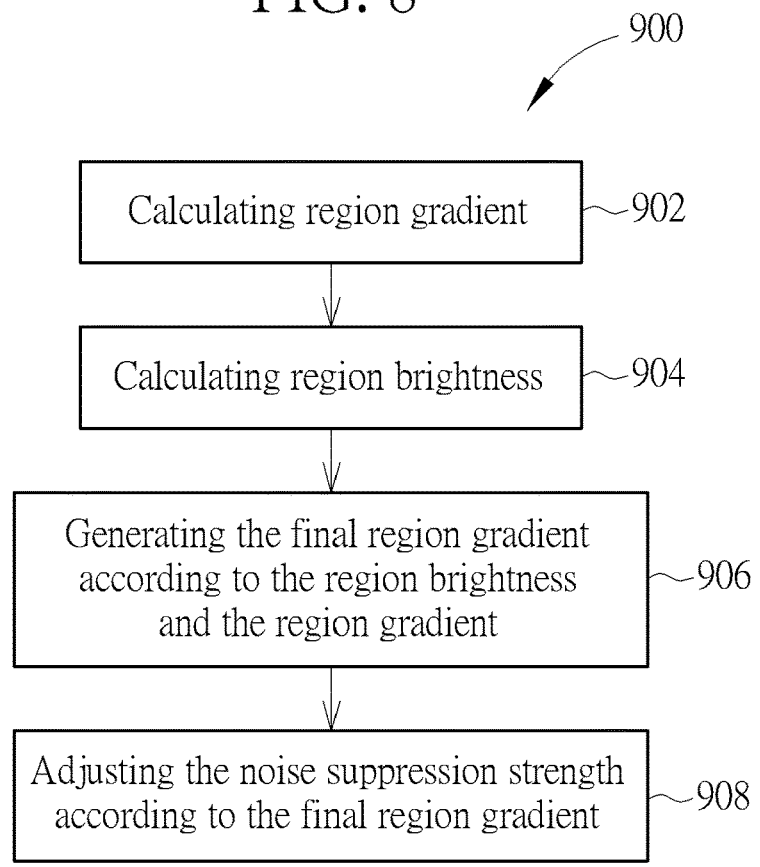
FIG. 9 is a schematic diagram showing the flowchart of an image adjustment method according to an embodiment of the invention.

Referring to FIG. 9, FIG. 9 is a schematic diagram showing the flow chart of an image adjustment method 900 according to an embodiment of the invention. It should be noted that if substantially the same result can be obtained, the steps are not necessarily performed in accordance with the execution order shown in FIG. 9 (for example, the order of execution of steps 902 and 904 can be interchanged), and some other steps can be inserted therein. The method shown in FIG. 9 may be adopted by the image processing circuit 1200 shown in FIG. 12, and comprises the following steps:

Step 902: calculating region gradient;

Step 904: calculating region brightness;

Step 906: generating the final region gradient (the adjusted region gradient) according to the region brightness and the region gradient; and Step 908: adjusting the noise suppression strength according to the final region gradient.

Adjusting the Threshold Values According to the Region Brightness

Figure 10:
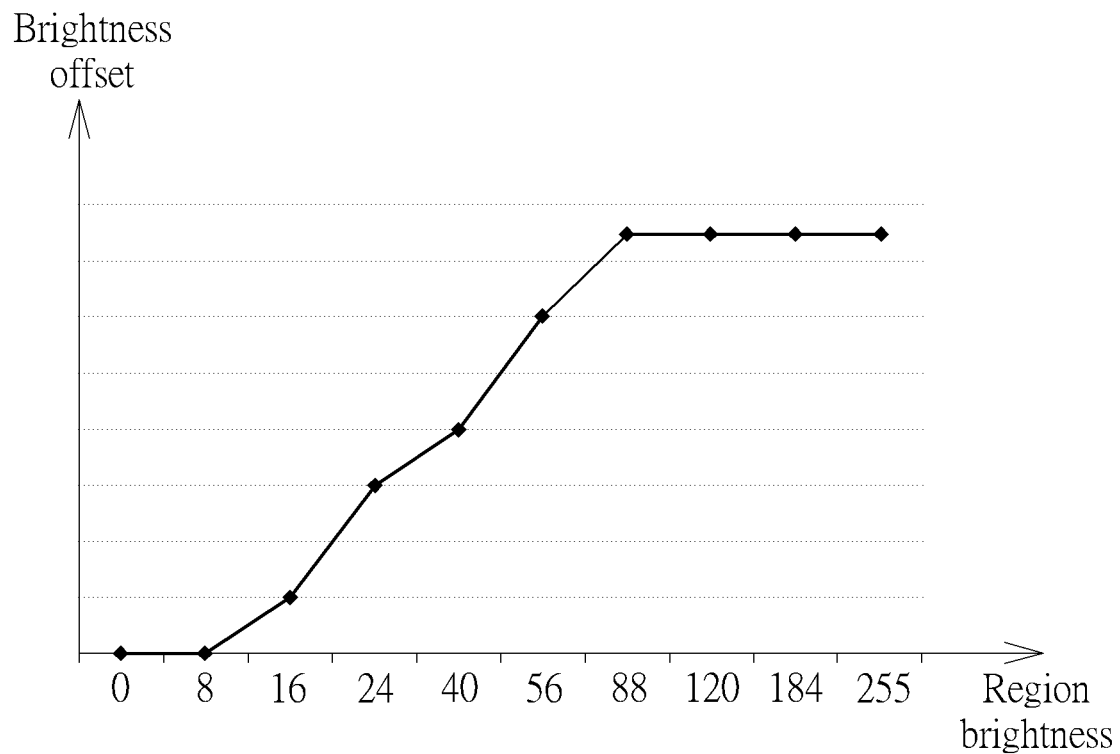
FIG. 10 is a curve showing the brightness offset with respect to the region brightness.

In the aforementioned approach, the degree of noise suppression is dynamically adjusted by controlling the value of α. In the following paragraphs, an alternative approach is described, in which the threshold value increases as the region brightness increases.

edge_thd1_final=edge_thd1+brightness_offset edge_thd2_final=edge_thd2+brightness_offset wherein edge_thd1_final and edge_thd2_final are respectively the adjusted edge feature upper threshold and the adjusted edge feature lower threshold, and the brightness_offset is a corresponding brightness offset (grayscale offset). Similar to the previous embodiment, it can also be a linear segmental adjustment function which varies with the region brightness. The trend of edge_thd1_final and edge_thd2_final varies with the brightness is shown in FIG. 10. However, this is for illustrative purposes only and is not intended to limit the scope of the invention. In addition, this alternative approach cannot only replace the image adjustment method 900 shown in FIG. 9, but also can be utilized together with the image adjustment method 900 to achieve more image improvement effects.

Figure 11:
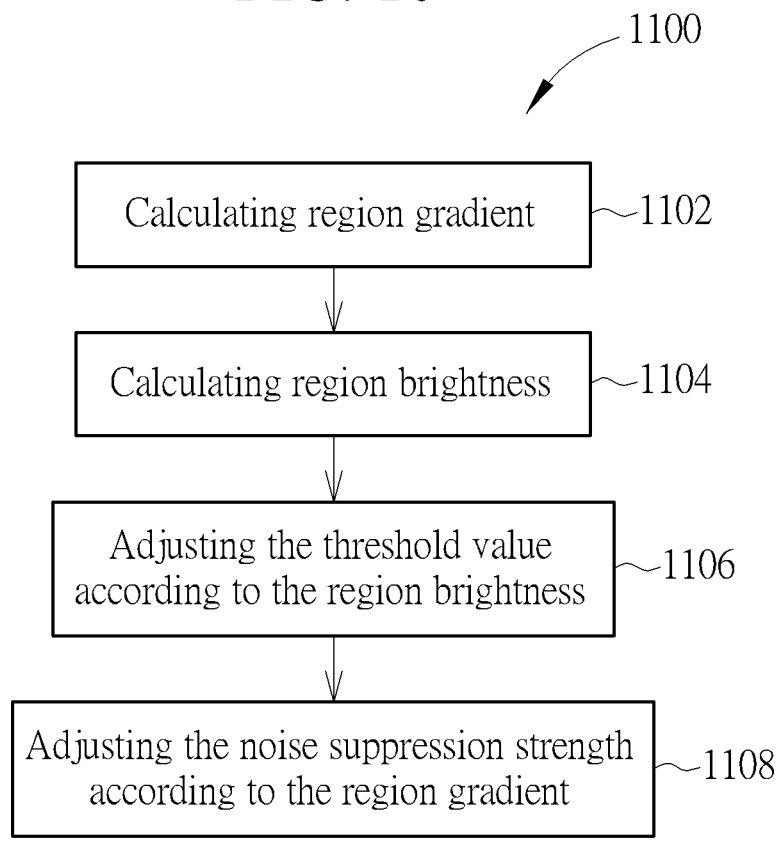
FIG. 11 is a schematic diagram showing the flowchart of another image adjustment method according to another embodiment of the invention.

The alternative approach is shown in FIG. 11. FIG. 11 is a schematic diagram showing the flowchart of another image adjustment method 1100 according to another embodiment of the invention. It should be noted that if substantially the same result can be obtained, the steps are not necessarily performed in accordance with the execution order shown in FIG. 11 (for example, the order of execution of steps 1102 and 1104 can be interchanged), and some other steps can be inserted therein. The method shown in FIG. 11 may be adopted by the image processing circuit 1200 shown in FIG. 12, and comprises the following steps:

Step 1102: calculating region gradient;

Step 1104: calculating region brightness;

Step 1106: adjusting the threshold value according to the region brightness; and Step 1108: adjusting the noise suppression strength according to the region gradient.

Figure 12:
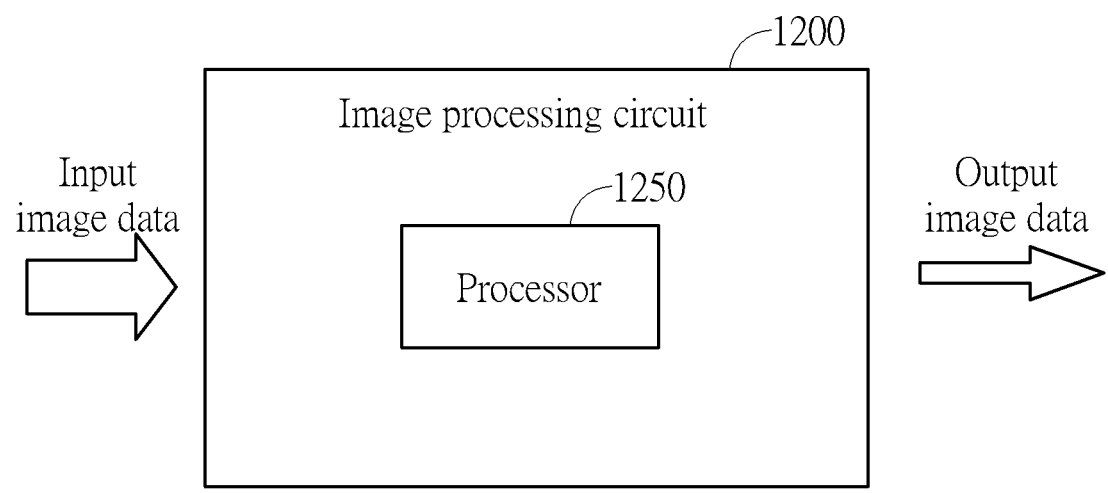
FIG. 12 is a schematic diagram of an image processing circuit according to an embodiment of the invention.

FIG. 12 is a schematic diagram of an image processing circuit according to an embodiment of the invention. The image processing circuit 1200 comprises a processor 1250 configured to perform the image adjustment method 900 and/or the image adjustment method 1100. For example, the processor 1250 may process the received image data and generate the output image with low noise and high edge features.

Actual Effect

Figure 13:
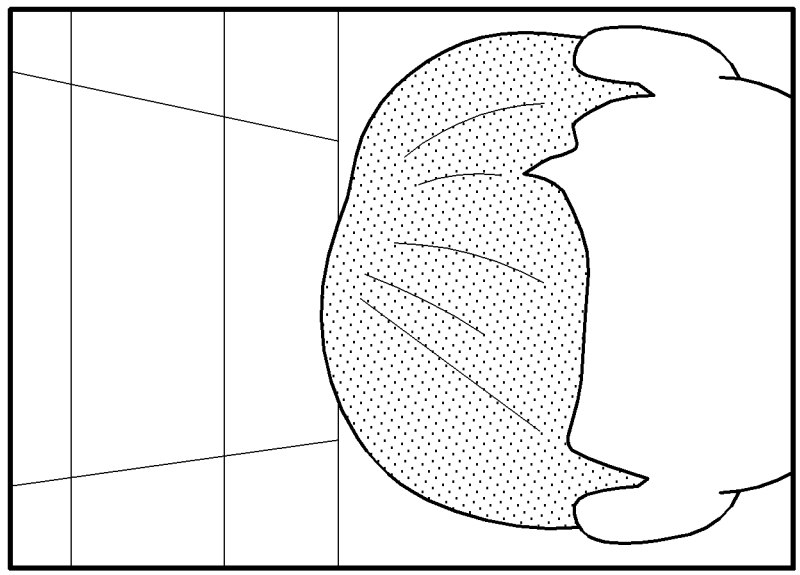
FIG. 13 is a schematic diagram of an image optimized by the image adjustment method of the invention.
Figure 13:
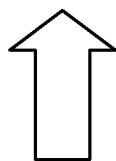
Figure 13:
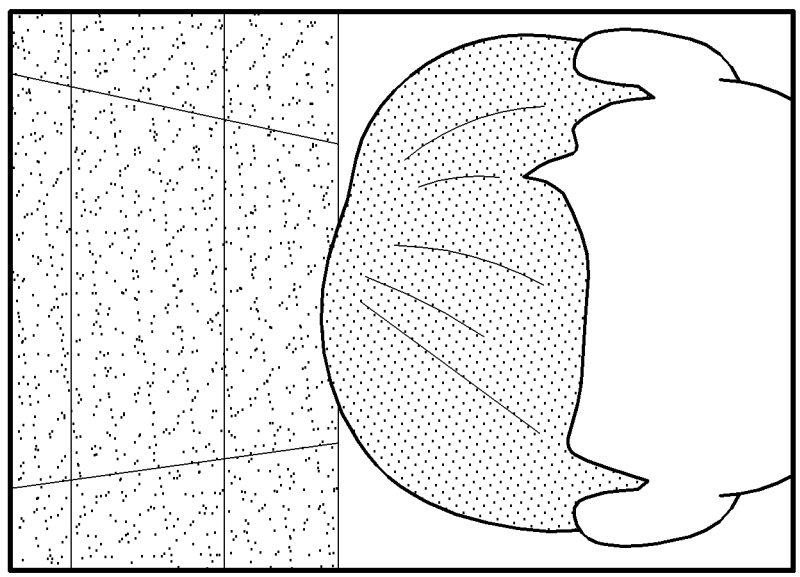

For example, please refer to FIG. 13, which is a schematic diagram of an image optimized by the image adjustment method 900 or 1100 of the invention, wherein the left side of FIG. 13 is an unadjusted image, and the right side of FIG. 13 is the optimized image obtained by applying the proposed image adjustment method. It can be seen from FIG. 13 that not only the noise on the ceiling is improved, but also some edge features are preserved, for example, different from FIG. 1, the details of human's hair can now be seen from FIG. 13 after performing image adjustment.

In summary, the proposed image adjustment method and the associated image processing circuit provided by the invention can effectively suppress noise in the image without introducing side effects (for example, without losing picture's details). In addition, the technology of the invention can also be applied in different color spaces, such as Gray, Raw, RGB, YUV, etc.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image adjustment method for adjusting an image, the image comprising at least one frame that comprises a plurality of pixels, the image adjustment method comprising:

sequentially processing the pixels in the at least one frame, wherein a pixel under processing is a current pixel, the current pixel and a plurality of adjacent pixels form a current block, and each current block is processed with following operations:

reading a grayscale value of each pixel in the current block;

determining a region grayscale value and a region variance of the current block according to the grayscale values of the pixels;

generating a variance adjustment parameter via a variance adjustment function, wherein the region grayscale value is a variable of the variance adjustment function;

generating an adjusted region variance according to the variance adjustment parameter and the region variance; and comparing the adjusted region variance with a variance threshold to determine whether to perform a noise suppression operation on the current pixel.

2. The image adjustment method of claim 1, wherein the region grayscale value of the current block is an average of the grayscale values of all pixels in the current block.

3. The image adjustment method of claim 1, wherein the variance adjustment function is a gradient adjustment function, the variance adjustment parameter is a gradient adjustment parameter and the region variance is a region gradient.

4. The image adjustment method of claim 3, wherein the region gradient comprises a vertical gradient and a horizontal gradient, and the region gradient is expressed as:

$$G=|Gx|+|Gy|$$

where Gx is the horizontal gradient and Gy is the vertical gradient.

5. The image adjustment method of claim 4, wherein the step of generating the adjusted region variance according to the variance adjustment parameter and the region variance is expressed as a following function:

$$G_{final}=f1(Brightness_{local}) \times G$$

where $G_{final}$ is the adjusted region variance, f1 is the gradient adjustment function, $Brightness_{local}$ is the region grayscale value and G is the region gradient.

6. The image adjustment method of claim 5, wherein the gradient adjustment function is a linear transfer function and is expressed as:

$$f1 = \begin{cases} v1, & \text{when } Brightness_{local} < b1 \\ v1 + (v2 - v1) \times \dfrac{Brightness_{local} - b1}{b2 - b1}, & \text{when } Brightness_{local} < b2 \\ v2 + (v3 - v2) \times \dfrac{Brightness_{local} - b2}{b3 - b2}, & \text{when } Brightness_{local} < b3 \\ vm, & \text{when } Brightness_{local} \geq bm \end{cases}$$

where b1~bm correspond to different brightness segments and v1~vm are generated according to f1(b1)~f1(bm).

7. The image adjustment method of claim 1, wherein the step of comparing the adjusted region variance with the variance threshold to determine whether to perform the noise suppression operation on the current pixel further comprises:
when the adjusted region variance of the current block is smaller than the variance threshold, not performing the noise suppression operation on the current pixel.

8. The image adjustment method of claim 1, further comprising:
using a filter to adjust the region grayscale value and generate an adjusted grayscale value, wherein the adjusted grayscale value is expressed as:

$$P_{out}=\alpha \times P_{lpf}+(1-\alpha)\times P_{in}$$

where $P_{in}$ is original grayscale value, $P_{lpf}$ is the grayscale value after being filtered, $P_{out}$ is the adjusted grayscale value and $\alpha$ is a noise suppression strength.

9. The image adjustment method of claim 8, wherein the noise suppression strength is expressed as:

$$\alpha = \begin{cases} coef1, \text{ when } G_{final} < \text{edge\_thd1} \\ coef1 + (coef2 - coef1)\times \frac{G_{final} - \text{edge\_thd1}}{\text{edge\_thd2} - \text{edge\_thd1}}, \\ \quad \text{when edge\_thd1} < G_{final} < \text{edge\_thd2} \\ coef2, \text{ when } G_{final} \geq \text{edge\_thd2} \end{cases}$$

where edge_thd1 and edge_thd2 are respectively a first edge feature threshold and a second edge feature threshold, coef1 and coef2 are respectively user defined noise suppression strengths.

10. The image adjustment method of claim 9, further comprising:
dynamically adjusting the first edge feature threshold and the second edge feature threshold according to the region grayscale value to generate an adjusted first edge feature threshold and an adjusted second edge feature threshold, wherein the adjusted first edge feature threshold and the adjusted second edge feature threshold are expressed as:

edge_thd1_final=edge_thd1+brightness_offset edge_thd2_final=edge_thd2+brightness_offset where edge_thd1_final and edge_thd2_final are respectively the adjusted first edge feature threshold and the adjusted second edge feature threshold, and brightness_offset is an grayscale offset.

11. An image processing circuit, comprising:
a processor, configured to sequentially process a plurality of pixels in at least one frame of an image, wherein a pixel under processing is a current pixel, the current pixel and a plurality of adjacent pixels form a current block, and the processor is configured to process each current block with following operations:
reading a grayscale value of each pixel in the current block;
determining a region grayscale value and a region variance of the current block according to the grayscale values of the pixels;
generating a variance adjustment parameter via a variance adjustment function, wherein the region grayscale value is a variable of the variance adjustment function;
generating an adjusted region variance according to the variance adjustment parameter and the region variance; and
comparing the adjusted region variance with a variance threshold to determine whether to perform a noise suppression operation on the current pixel.

12. The image processing circuit of claim 11, wherein the region grayscale value of the current block is an average of the grayscale values of all pixels in the current block.

13. The image processing circuit of claim 11, wherein the variance adjustment function is a gradient adjustment function, the variance adjustment parameter is a gradient adjustment parameter and the region variance is a region gradient.

14. The image processing circuit of claim 13, wherein the region gradient comprises a vertical gradient and a horizontal gradient, and the region gradient is expressed as:

$$G=|Gx|+|Gy|$$

where Gx is the horizontal gradient and Gy is the vertical gradient.

15. The image processing circuit of claim 14, wherein the operation of generating the adjusted region variance according to the variance adjustment parameter and the region variance is expressed as a following function:

$$G_{final}=f1(\text{Brightness}_{local})\times G$$

where $G_{final}$ is the adjusted region variance, f1 is the gradient adjustment function, $\text{Brightness}_{local}$ is the region grayscale value and G is the region gradient.

16. The image processing circuit of claim 15, wherein the gradient adjustment function is a linear transfer function and is expressed as:

$$f1 = \begin{cases} v1, \text{ when } \text{Brightness}_{local} < b1 \\ v1 + (v2-v1)\times \frac{\text{Brightness}_{local} - b1}{b2 - b1}, \text{ when } \text{Brightness}_{local} < b2 \\ v2 + (v3-v2)\times \frac{\text{Brightness}_{local} - b2}{b3 - b2}, \text{ when } \text{Brightness}_{local} < b3 \\ vm, \text{ when } \text{Brightness}_{local} \geq bm \end{cases}$$

where b1~bm correspond to different brightness segments and v1~vm are generated according to f1(b1)~f1(bm).

17. The image processing circuit of claim 11, wherein the operation of comparing the adjusted region variance with the variance threshold to determine whether to perform the noise suppression operation on the current pixel further comprises:
when the adjusted region variance of the current block is smaller than the variance threshold, not performing the noise suppression operation on the current pixel.

18. The image processing circuit of claim 11, wherein the processor is further configured to process each current block with following operation:
using a filter to adjust the region grayscale value and generate an adjusted grayscale value, wherein the adjusted grayscale value is expressed as:

$$P_{out}=\alpha \times P_{lpf}+(1-\alpha)\times P_{in}$$

where $P_{in}$ is original grayscale value, $P_{lpf}$ is the grayscale value after being filtered, $P_{out}$ is the adjusted grayscale value and $\alpha$ is a noise suppression strength.

19. The image processing of claim 18, wherein the noise suppression strength is expressed as:

$$\alpha = \begin{cases} coef1, & \text{when } G_{final} < \text{edge\_thd1} \\ coef1 + (coef2 - coef1) \times \dfrac{G_{final} - \text{edge\_thd1}}{\text{edge\_thd2} - \text{edge\_thd1}}, \\ & \text{when edge\_thd1} < G_{final} < \text{edge\_thd2} \\ coef2, & \text{when } G_{final} \geq \text{edge\_thd2} \end{cases}$$

where edge_thd1 and edge_thd2 are respectively a first edge feature threshold and a second edge feature threshold, coef1 and coef2 are respectively user defined noise suppression strengths.

20. The image processing of claim 19, wherein the processor is further configured to process each current block with following operation:

dynamically adjusting the first edge feature threshold and the second edge feature threshold according to the region grayscale value to generate an adjusted first edge feature threshold and an adjusted second edge feature threshold, wherein the adjusted first edge feature threshold and the adjusted second edge feature threshold are expressed as:

edge_thd1_final=edge_thd1+brightness_offset edge_thd2_final=edge_thd2+brightness_offset where edge_thd1_final and edge_thd2_final are respectively the adjusted first edge feature threshold and the adjusted second edge feature threshold, and brightness_offset is an grayscale offset.

* * * * *